US010407755B2

(12) United States Patent
Nardi et al.

(10) Patent No.: US 10,407,755 B2
(45) Date of Patent: Sep. 10, 2019

(54) SOLID-STATE METHOD FOR FORMING AN ALLOY

(71) Applicant: United Technologies Corporation, Farmington, CT (US)

(72) Inventors: Aaron T. Nardi, East Granby, CT (US); Paul Sheedy, Bolton, CT (US); James T. Beals, West Hartford, CT (US); Daniel V. Viens, Mansfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 476 days.

(21) Appl. No.: 15/109,707

(22) PCT Filed: Jan. 5, 2015

(86) PCT No.: PCT/US2015/010081
§ 371 (c)(1),
(2) Date: Jul. 5, 2016

(87) PCT Pub. No.: WO2015/105735
PCT Pub. Date: Jul. 16, 2015

(65) Prior Publication Data
US 2016/0326610 A1    Nov. 10, 2016

Related U.S. Application Data

(60) Provisional application No. 61/924,830, filed on Jan. 8, 2014.

(51) Int. Cl.
| | |
|---|---|
| *C22C 1/04* | (2006.01) |
| *B22F 3/15* | (2006.01) |
| *C23C 24/04* | (2006.01) |
| *B23K 20/12* | (2006.01) |
| *B22F 1/00* | (2006.01) |
| *B22F 1/02* | (2006.01) |
| *B22F 3/02* | (2006.01) |
| *B22F 3/16* | (2006.01) |
| *B22F 3/24* | (2006.01) |
| *C22C 19/03* | (2006.01) |
| *C22F 1/10* | (2006.01) |

(52) U.S. Cl.
CPC .......... *C22C 1/0491* (2013.01); *B22F 1/0003* (2013.01); *B22F 1/025* (2013.01); *B22F 3/02* (2013.01); *B22F 3/15* (2013.01); *B22F 3/16* (2013.01); *B22F 3/24* (2013.01); *B23K 20/122* (2013.01); *C22C 1/0433* (2013.01); *C22C 19/03* (2013.01); *C22F 1/10* (2013.01); *C23C 24/04* (2013.01); *B22F 2003/248* (2013.01); *B22F 2301/052* (2013.01); *B22F 2301/15* (2013.01); *B22F 2301/205* (2013.01); *B22F 2301/40* (2013.01); *B22F 2998/10* (2013.01)

(58) Field of Classification Search
CPC ....... C22C 1/04; C22C 1/0491; C22C 1/0433; B22F 1/0003; B22F 1/025; B23K 20/122; C22F 1/10; C23C 24/04
USPC .......................................................... 419/29
See application file for complete search history.

(56) References Cited

U.S. PATENT DOCUMENTS

| | | |
|---|---|---|
| 2003/0206819 A1 | 11/2003 | Talia et al. |
| 2006/0032891 A1 | 2/2006 | Flak et al. |
| 2006/0090593 A1 | 5/2006 | Liu |
| 2007/0098913 A1 | 5/2007 | Raybould et al. |
| 2010/0092789 A1 | 4/2010 | Heck et al. |
| 2013/0039799 A1 | 2/2013 | Bono et al. |
| 2013/0118312 A1 | 5/2013 | Bono et al. |

FOREIGN PATENT DOCUMENTS

| | | |
|---|---|---|
| EP | 2604723 | 6/2013 |
| WO | 2005113173 | 12/2005 |

OTHER PUBLICATIONS

International Search Report and Written Opinion for PCT Application No. PCT/US2015/010081 dated Apr. 21, 2015.
Karthikeyan, J. (prepared). Cold spray technology: International status and USA efforts. ASB Industries Inc. Dec. 2004. Retrieved from: http://www.asbindustries.com/documents/int_status_report.pdf.
Irissou, E., Legoux, J-G., Ryabinin, A.N., Jodoin, B., and Moreau, C. (2007). Review on cold spray process and technology: Part I—Intellectual property. ASM International. Journal of Thermal Spray Technology, 17(4). Dec. 2008. pp. 495-516.
European Search Report for European Patent Application No. 15734825.1 completed Oct. 23, 2017.

*Primary Examiner* — Edward M Johnson
(74) *Attorney, Agent, or Firm* — Carlson, Gaskey & Olds, P.C.

(57) ABSTRACT

The method includes providing a powder that has heterogeneous particles with a ratio, by weight, of an amount of nickel to an amount of a metal. The ratio is selected in accordance with a compositional ratio that can substantially bear a nickel intermetallic precipitate of the nickel and the metal. The heterogeneous particles are then consolidated and thermally treated to interdiffuse the nickel and the metal. The interdiffused nickel and metal are then precipitation treated to precipitate the nickel intermetallic.

16 Claims, 1 Drawing Sheet

SOLID-STATE METHOD FOR FORMING AN ALLOY

CROSS-REFERENCE TO RELATED APPLICATION

This application claims priority to U.S. Provisional Application No. 61/924,830, filed Jan. 8, 2014.

BACKGROUND

This disclosure relates to a solid-state alloy processing and articles formed thereby.

Solid-state processing involves the treatment of materials below their melting points. In contrast, fusion processing involves the treatment of materials above their melting points. Cold spray or cold gas-dynamic spraying, is one example of solid-state processing. Cold spraying, and variations thereof, utilize pressurized gas to accelerate particles through a nozzle toward a target surface while the temperature of the particles remains below the melting point. The particles are accelerated above a critical velocity such that the high kinetic energy of the particles causes plastic deformation and bonding with the target surface.

SUMMARY

A solid-state method for forming an alloy according the present application includes providing a powder including composite particles having a ratio, by weight, of an amount of nickel to an amount of a metal, the ratio being selected in accordance with a compositional ratio that can substantially bear a nickel intermetallic precipitate of the nickel and the metal, consolidating the composite particles of the powder, thermally treating the consolidated powder to interdiffuse the nickel and the metal, and precipitation treating the interdiffused nickel and metal to precipitate the nickel intermetallic.

In a further embodiment of any of the foregoing embodiments, the composite particles individually include the nickel and the metal.

In a further embodiment of any of the foregoing embodiments, the ratio is 30:70 to 99:1.

In a further embodiment of any of the foregoing embodiments, the ratio is 58:42 to 62:38.

In a further embodiment of any of the foregoing embodiments, the ratio is 60:40.

In a further embodiment of any of the foregoing embodiments, the ratio nominally is +/−2% of a critical ratio for substantially bearing the nickel intermetallic precipitate.

In a further embodiment of any of the foregoing embodiments, the metal is selected from the group consisting of aluminum, titanium, cobalt, iron, boron, chromium, molybdenum, niobium, tantalum, tungsten, rhenium, platinum, zirconium, yttrium, hafnium, silicon, and combinations thereof.

In a further embodiment of any of the foregoing embodiments, the nickel intermetallic includes at least one of an aluminide and a titanide.

In a further embodiment of any of the foregoing embodiments, the nickel intermetallic is $Ni_3Ti$.

In a further embodiment of any of the foregoing embodiments, the nickel intermetallic is $Ni_3Al$.

In a further embodiment of any of the foregoing embodiments, the consolidating is selected from the group consisting of cold spraying and mechanical pressing.

In a further embodiment of any of the foregoing embodiments, the composite particles each distinctly have a central core and a continuous shell surrounding the core, the central core being one of the nickel or the metal and the continuous shell being the other of the nickel or the metal.

In a further embodiment of any of the foregoing embodiments, the composite particles distinctly have a laminar structure of layers of the nickel and layers of the metal.

In a further embodiment of any of the foregoing embodiments, the consolidating includes cold spraying the composite powder followed by hot isostatic pressing to reduce porosity of the consolidated powder.

An article having a solid-state powder-processed alloy according to an example of the present disclosure includes a powder-processed region having a composition including nickel and a metal. The powder-processed region has a microstructure including fine, equiaxed grains of an average maximum dimension no larger than ten micrometers with a nickel intermetallic precipitate dispersed therethrough.

In a further embodiment of any of the foregoing embodiments, the composition includes a ratio of an amount of the nickel, by weight, to an amount of the metal, by weight of 30:70 to 99:1.

In a further embodiment of any of the foregoing embodiments, the nickel intermetallic includes at least one of an aluminide and a titanide.

In a further embodiment of any of the foregoing embodiments, the powder-processed region is disposed on a titanium-based substrate.

A further embodiment of any of the foregoing embodiments includes an intermediate bond layer between the powder-processed region and the titanium-based substrate.

A solid-state method for forming an alloy according to an example of the present disclosure includes mechanically mixing nickel and a metal in a ratio, by weight, of an amount of nickel to an amount of the metal, the ratio being selected in accordance with a compositional ratio that substantially bears a nickel intermetallic precipitate of the nickel and the metal, thermally treating the mixed nickel and metal to interdiffuse the nickel and the metal, and precipitation treating the interdiffused nickel and metal to precipitate the nickel intermetallic.

In a further embodiment of any of the foregoing embodiments, the mechanical mixing includes additive friction stir processing.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Disclosed herein is a solid-state method for forming an alloy or for forming an article having the alloy. For example, nickel alloys can be hardened by the presence of a hard dispersed nickel intermetallic phase. However, the nickel intermetallic phase is incompatible with solid-state alloy-forming techniques. For example, the relatively high hardness/low deformability of the nickel intermetallic can be challenging to deposit using cold spraying, especially in co-deposition with a relatively low hardness/high deformability nickel alloy. As will be described, the solid-state method disclosed herein provides the ability to form a low oxide, fine-grained nickel alloy with a dispersed phase using solid-state processing. The alloy can have a good combination of hardness, low density and modulus, and can be used for bearings or other components that would benefit from enhanced wear-resistance, but is not limited to such components.

An example solid-state method for forming the alloy includes providing a powder that has composite particles that have a ratio, by weight, of an amount of nickel to an amount of a metal. A powder includes loose, substantially dry particles. The composite particles individually include the nickel and the metal, which in one example are provided as pure or substantially pure forms. The nickel and metal can be physically intermixed in an individual particle, but are not in solid solution. The ratio is selected in accordance with a compositional ratio that can substantially bear a nickel intermetallic phase of the nickel and the metal, which in some examples is a precipitate. The composite particles of the powder are then consolidated, followed by a thermal treatment of the consolidated powder to interdiffuse the nickel and the metal. The interdiffused nickel and metal is then precipitation treated to precipitate the nickel intermetallic. Although the examples herein may be based on a binary system of nickel and a metal, it is to be understood that the examples are not limited to binary systems and ternary or higher systems can also benefit from this disclosure.

Figure 1:
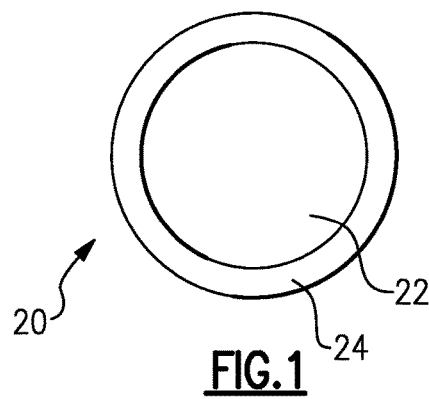
FIG. 1 illustrates an example core/shell architecture particle.

The use of the composite particles can provide a short diffusion length during interdiffusion of the nickel and the metal, which can contribute to achieving a high degree of alloy homogenization. In further examples, the composite particles have a controlled architecture with regard to the arrangement of the nickel and the metal. FIG. 1 shows one example in which a representative composite particle 20 distinctly includes a central core 22 and a continuous shell 24 that surrounds the central core 22. The term "distinct," or variations thereof, refers to observable or detectable boundaries between regions. The central core 22 is the nickel or the metal, and the shell 24 is the other of the nickel or the metal. The shell 24 can be formed by plating the nickel or the metal onto the central cores 22, but is not limited to plating.

Figure 2:
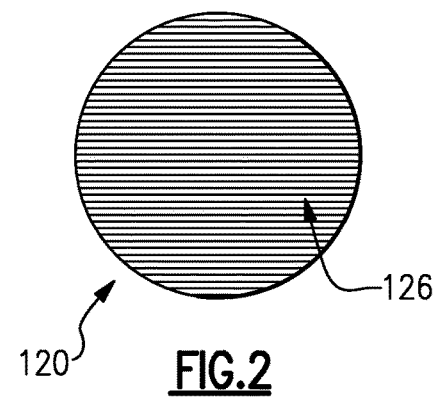
FIG. 2 illustrates an example laminar architecture particle.

Alternatively, as shown in FIG. 2, a representative composite particle 120 distinctly includes a laminar structure 126 of layers of nickel and the metal. The laminar structure can be formed by mechanical milling of particles of nickel and particles of metal. The mechanical milling repeatedly flattens, fractures and mechanically bonds the particles to form the laminar structure.

The selected metal of the composite particles includes one or more metals that can form intermetallic phases with the nickel. For example, the metal can include aluminum, titanium, cobalt, iron, boron, chromium, molybdenum, niobium, tantalum, tungsten, rhenium, platinum, zirconium, yttrium, hafnium, silicon, or combinations thereof. In further examples, the nickel intermetallic can include nickel intermetallic phases of the chemical formulas NiM, NiM$_3$, Ni$_3$M, Ni$_2$M$_3$, Ni$_5$M$_3$, NiM$_2$, or Ni$_2$M, where M is at least one of aluminum, titanium cobalt, iron, boron, carbon, chromium, molybdenum, niobium, tantalum, tungsten, rhenium, platinum, zirconium, yttrium, hafnium, silicon, or combinations thereof. In one further example, the Ni$_3$M is the most desirable of the intermetallic phases for providing high strength and hardness.

The ratio of the nickel and the metal is selected in accordance with the compositional ratio that can substantially bear the desired nickel intermetallic precipitate of the nickel and the metal. That is, the nickel intermetallic is the primary precipitate upon solution/precipitation treating of the interdiffused nickel and metal in the disclosed method. Solution treating can be conducted at temperatures of greater than about 900° C. in vacuum or an inert atmosphere, followed by rapid cooling to room temperature. Precipitation (aging) can then be conducted at temperatures greater than 500° C. in vacuum, inert atmosphere or air, for hold times ranging from 2 hours to 40+ hours.

The selected ratio can control the precipitate chemistry and thus the properties of the resulting alloy. In one example, the ratio of Ni:M by weight is 30:70 to 99:1. In further examples, the ratio of Ni:M by weight is 55:45 to 65:35. In further examples, the ratio is 58:42 to 62:38, and in one further example the ratio is 60:40.

In one further example, the ratio of 60:40 is a critical ratio for substantially bearing the nickel intermetallic precipitate, for example the intermetallic of formula Ni$_3$M. Thus, deviation from the ratio can result in lesser amounts of the desired nickel intermetallic and increased amounts of other intermetallic phases that may be less desirable. In one further example, the ratio nominally is +/−2% of the critical ratio.

The consolidation of the composite particles of the powder can include a technique selected from cold spraying and mechanical pressing. For example, the cold spraying includes accelerating the composite particles at a velocity above a critical velocity, and at a temperature well below the melting temperature of the metals, to deform and bond the composite particles onto a target surface. The deposited particles may include voids or porosity and, in this regard, the technique of isostatic pressing may additionally be utilized after the cold spray deposition for further consolidation to reduce the porosity. For example, the isostatic pressing can include heating to a temperature of no greater than approximately 550° C. at a pressure of 5 ksi or higher for a time of 2-20 hours. Alternatively, for the pressing technique, the heterogeneous powder is compacted in a die or other tool at a relatively low temperature, such as less than 1000° C., to consolidate the powder, which can then be isostatically pressed as described above. The consolidated powder is then thermally treated to interdiffuse/solution treat the nickel and the metal. The heterogeneous particles provide short diffusion lengths between the nickel and the metal such that relatively lower temperatures and/or times are needed for thermal treatment to fully or substantially fully interdiffuse the nickel and the metal. After interdiffusion, the interdiffused nickel/metal is then precipitation treated, as disclosed above, to precipitate the nickel intermetallic. In some instances, the isostatic pressing treatment described above may be utilized after the thermal treatment. The thermal treatment(s) can cause formation of porosity, and it may be advantageous to conduct the (hot) isostatic pressing treatment after the thermal treatment, in addition to, or in lieu of occurring directly after deposition/initial mechanical pressing.

Figure 3:
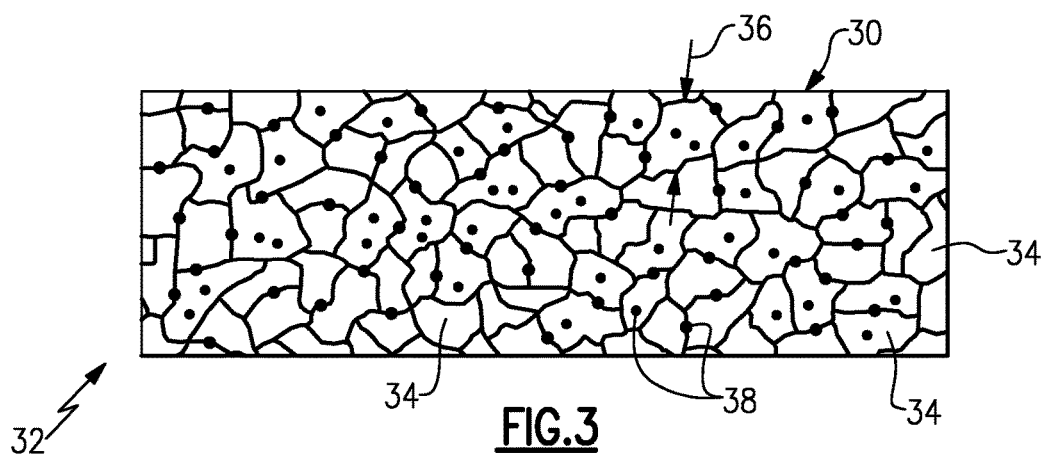
FIG. 3 illustrates an example powder-processed region of an alloy having a microstructure including fine grains of an average maximum dimension no larger than ten micrometers with a dispersed nickel intermetallic phase.

The plastic deformation imparted on the particles from the cold spray deposition or the pressing causes recrystallization during the thermal treatment step and thus a relatively fine, equiaxed grain size can be achieved. For example, the equiaxed grains have an average maximum dimension of no greater than 10 micrometers. FIG. 3 illustrates an example microstructure 30 of an article 32 processed according to the method described herein. The microstructure 30 has a powder-processed region that has a composition that includes the nickel and the metal, as described above. The microstructure 30 includes fine, equiaxed grains 34 that have an average maximum dimension, represented at 36, no greater than 10 micrometers, with a nickel intermetallic precipitate 38 dispersed therethrough. The precipitate 38 can be inter- and intra-granular.

Figure 4:
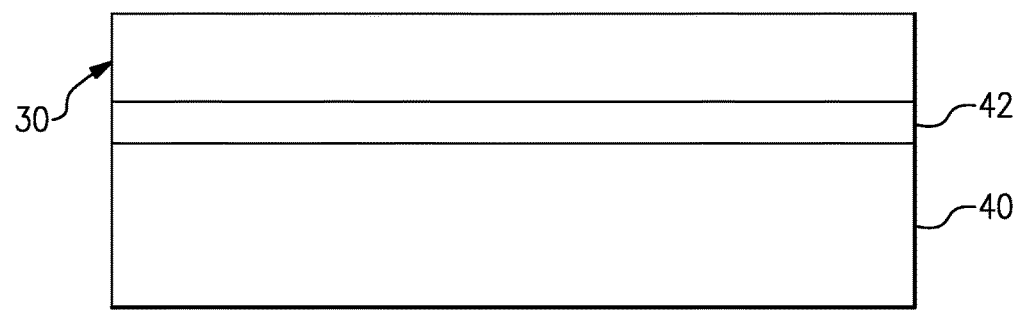
FIG. 4 illustrates an article having the alloy of FIG. 3.

In the further example shown in FIG. 4, the microstructure 30 of the powder-processed region is in a coating layer that is deposited on a substrate 40. For example, the substrate 40 is a titanium-based substrate. In some examples, there is an intermediate bond layer 42 between the coating layer and the substrate 40, as shown in FIG. 4. The intermediate bond layer 42 can include nickel, aluminum, titanium, cobalt, iron, boron, carbon, chromium, molybdenum, niobium, tantalum, tungsten, rhenium, platinum, zirconium, yttrium, hafnium, silicon, associated oxide and nitride compounds of these elements, and combinations thereof. Preferred compositions for the intermediate bond layer 42 can be chosen so as to be unreactive or substantially unreactive with the nickel and the metal composition of the microstructure 30.

In another aspect, a solid-state method for forming an alloy disclosed herein can include mechanically mixing the nickel and the metal in the selected ratio. The nickel and the metal can then be thermally treated to interdiffuse/solution treat the nickel and the metal, followed by precipitation treating the interdiffused nickel and metal to precipitate the nickel intermetallic. In one example, the mechanical mixing can include additive friction stir processing.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A solid-state method for forming an alloy, the method comprising:
    providing a powder including composite particles having a ratio, by weight, of an amount of nickel to an amount of a metal, the ratio being selected in accordance with a compositional ratio that can substantially bear a nickel intermetallic precipitate of the nickel and the metal;
    consolidating the composite particles of the powder;
    thermally treating the consolidated powder to interdiffuse the nickel and the metal; and
    precipitation treating the interdiffused nickel and metal to precipitate the nickel intermetallic.

2. The method as recited in claim 1, wherein the composite particles individually include the nickel and the metal.

3. The method as recited in claim 1, wherein the ratio is 30:70 to 99:1.

4. The method as recited in claim 1, wherein the ratio is 58:42 to 62:38.

5. The method as recited in claim 1, wherein the ratio is 60:40.

6. The method as recited in claim 1, wherein the ratio nominally is +/−2% of a critical ratio for substantially bearing the nickel intermetallic precipitate.

7. The method as recited in claim 1, wherein the metal is selected from the group consisting of aluminum, titanium, cobalt, iron, boron, chromium, molybdenum, niobium, tantalum, tungsten, rhenium, platinum, zirconium, yttrium, hafnium, silicon, and combinations thereof.

8. The method as recited in claim 1, wherein the nickel intermetallic includes at least one of an aluminide and a titanide.

9. The method as recited in claim 1, wherein the nickel intermetallic is $Ni_3Ti$.

10. The method as recited in claim 1, wherein the nickel intermetallic is $Ni_3Al$.

11. The method as recited in claim 1, wherein the consolidating is selected from the group consisting of cold spraying and mechanical pressing.

12. The method as recited in claim 1, wherein the composite particles each distinctly have a central core and a continuous shell surrounding the core, the central core being one of the nickel or the metal and the continuous shell being the other of the nickel or the metal.

13. The method as recited in claim 1, wherein the composite particles distinctly have a laminar structure of layers of the nickel and layers of the metal.

14. The method as recited in claim 1, wherein the consolidating includes cold spraying the composite powder followed by hot isostatic pressing to reduce porosity of the consolidated powder.

15. A solid-state method for forming an alloy, the method comprising:
    mechanically mixing nickel and a metal in a ratio, by weight, of an amount of nickel to an amount of the metal, the ratio being selected in accordance with a compositional ratio that substantially bears a nickel intermetallic precipitate of the nickel and the metal;
    thermally treating the mixed nickel and metal to interdiffuse the nickel and the metal; and
    precipitation treating the interdiffused nickel and metal to precipitate the nickel intermetallic.

16. The method as recited in claim 15, wherein the mechanical mixing includes additive friction stir processing.

* * * * *